UNITED STATES PATENT OFFICE.

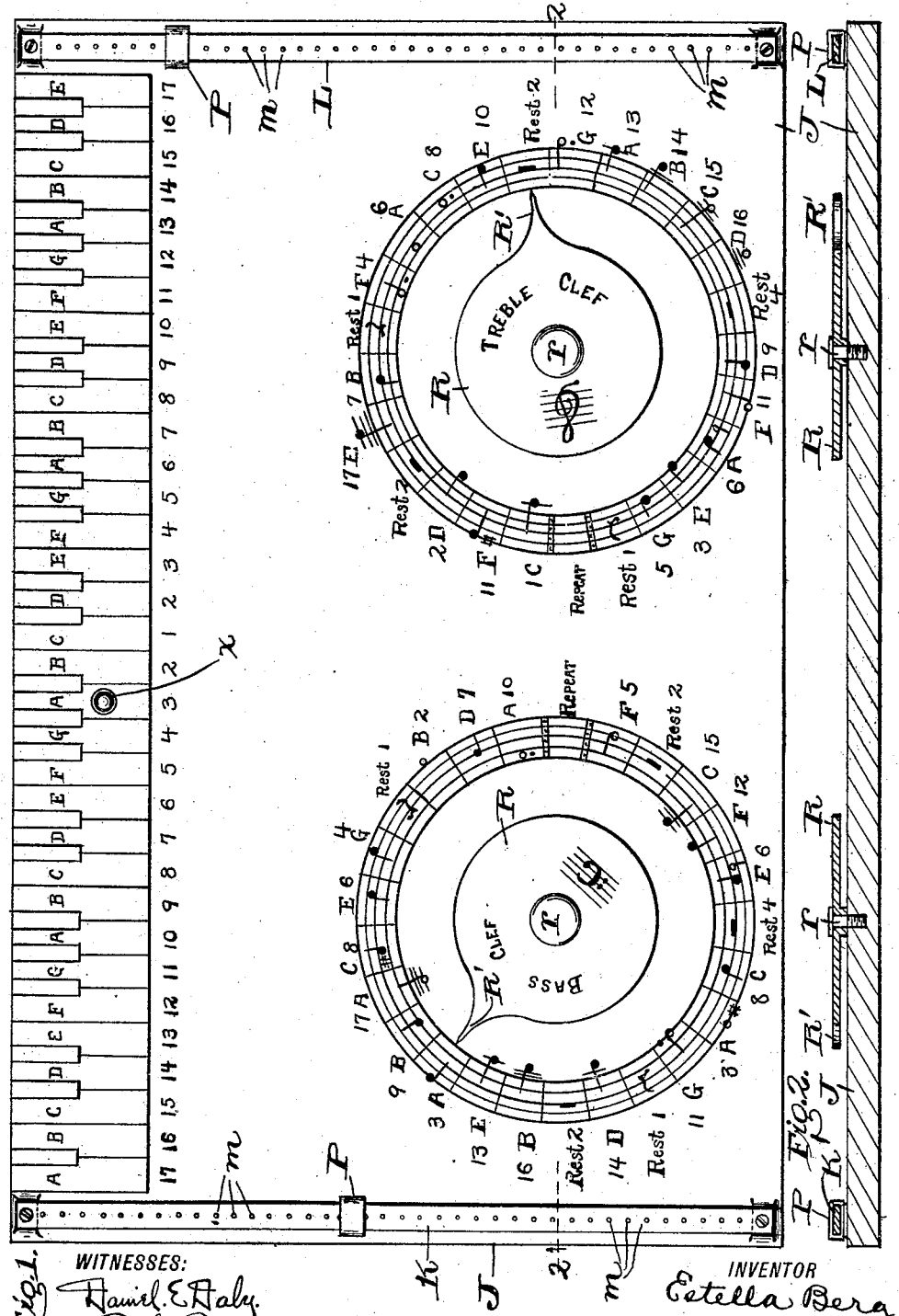

ESTELLA BERG, OF CLEVELAND, OHIO, ASSIGNOR OF ONE-HALF TO EMIL BERG, OF CLEVELAND, OHIO.

EDUCATIONAL GAME.

No. 848,282.    Specification of Letters Patent.    Patented March 26, 1907.

Application filed March 3, 1905. Serial No. 248,287.

*To all whom it may concern:*

Be it known that I, ESTELLA BERG, a citizen of the United States of America, residing at Cleveland, in the county of Cuyahoga and State of Ohio, have invented certain new and useful Improvements in Educational Games; and I hereby declare the following to be a full, clear, and exact description of the invention, such as will enable others skilled in the art to which it pertains to make and use the same.

This invention relates to improvements in educational games designed to afford elementary instruction in music, and more especially elementarily instruction relative to playing on the keyboard of a piano or organ.

One object of this invention is to devise not only an enjoyable game for children, but to provide a game which while being played will assist the players in memorizing such elementary musical knowledge as, for instance, the use of the staff, the distinction between the treble staff and the bass staff, the relative lengths of different notes and rests, the order of pitch representations on the treble staff from middle C upward, the order of pitch representations on the bass staff from middle C downward, and the significance of such signs, marks, or characters as sharps, flats, the dot, and the repeat.

Another object is to familiarize the players with the keyboard of a piano or organ and to facilitate reading of notes generally.

With these objects in view this invention consists in certain features of construction and combinations of parts and peculiarities hereinafter described, and pointed out in the claims.

In the accompanying drawings, Figure 1 is a top plan of apparatus suitable for use in playing my improved game. Fig. 2 is a section on line 2 2, Fig. 1, looking in the direction indicated by the arrow.

Referring to the drawings, J indicates a table or board which is provided at its upper surface with two parallel flexible strips K and L of cardboard or other material. The strips K and L are arranged at and extend along the left-hand side edge and right-hand side edge, respectively, of the board J and attached to the latter in any approved manner at both ends—that is, the strips K and L are attached only at the ends to the board J and respectively form a slideway for a slide-forming sleeve P, which embraces and is slidable endwise of the respective strip. Each slideway-forming strip is graduated, being provided with a row of circles, marks, or characters $m$, which are suitably spaced longitudinally of the strip. The graduated strips K and L and engaging indicator-forming sleeves P are instrumental in counting the points made by the players.

My improved game, as illustrated, is designed to be played by two persons provided with distinguishing-checkers, respectively. One of the players counts the number of points made by him by the use of the strip K and engaging sleeve, and the other player uses the strip L and engaging sleeve in counting the number of points made by him.

Upon the upper portion of the board J is a picture or representation of the keyboard of a piano or organ. As the white keys of a keyboard are named after the names of the first seven letters of the alphabet, A, B, C, D, E, F, and G, the white-key-representing spaces or divisions of the keyboard illustrated bear the said letters.

The space representing the key which is named "middle C" is midway between the two ends of the keyboard, bears the letter "C," and is numbered "1" for the purpose hereinafter made apparent. The key-representing spaces or divisions between the right-hand side of the space or division numbered "1" and the strip L are numbered "2," "3," "4," "5," "6," "7," "8," "9," "10," "11," "12," "13," "14," "15," "16," and "17," respectively, and bear the letters "D," "E," "F," "G," "A," "B," "C," "D," "E," "F," "G," "A," "B," "C," "D," and "E," respectively. The key-representing spaces or divisions between the left-hand side of the key-representing space or division numbered "1" and the strip B are numbered "2," "3," "4," "5," "6," "7," "8," "9," "10," "11," "12," "13," "14," "15," "16," and "17," respectively, and bear the letters "B," "A," "G," "F," "E," "D," "C," "B," "A," "G," "F," "E," "D," "C," "B," and "A," respectively.

Upon the board A below the representation of the keyboard are drawn or pictured two circular staffs, which are suitably spaced laterally, and each staff therefore surrounds a circular space centrally of which a disk R is pivoted, as at $r$, which disk is provided with a pointer or indicator R', arranged to coöperate with a mark, sign, or character upon the said staff in determining the number of points won or lost by the player using the said staff and indicator.

In playing the game one of the players would of course use one of the staffs and the coöperating indicator, whereas the other staff and coöperating indicator would be employed by the other player. One of the staffs is the bass staff, and the disk bearing the indicator which coöperates with the said staff bears the words "Bass clef" and the character known as the "bass clef." The other staff is the treble staff, and the disk bearing the indicator which coöperates with the treble staff bears the words "Treble clef" and the character known as the "treble clef." Upon each staff are placed notes, rests, or other marks, signs, or characters arranged at suitable intervals circumferentially of the staff.

The notes of the treble staff are lettered and numbered to correspond with the letters and numbers of the relative key-representing spaces or divisions from middle C, inclusive, upward (to the right) of the picture or representation of the keyboard. The notes of the bass clef are numbered and lettered to correspond with the numbers and letters of the relative key-representing spaces and divisions, respectively, from middle C, inclusive, downward (to the left) of the picture or representation of the keyboard. Each circular staff and characters thereon constitute a musical notation arranged in the form of a circle, and each musical notation comprises quarter-notes, counting one; one or more half-notes, counting two; one or more dotted half-notes, counting three; one or more whole notes, counting four, and one or more dotted whole notes, counting six. Each musical notation comprises also a repeat and different rests—such, for instance, as a quarter-rest, a half-rest, and a whole rest. Each musical notation preferably comprises also a note preceded by a sharp and another note preceded by a flat.

In playing the player scores one, two, three, four, or six points, according as the indicator which he spins points, upon ceasing to revolve, to a quarter-note, a half-note, a dotted half-note, a whole note, or a dotted whole note, respectively, and misses one turn, two turns, or four turns if the indicator stops opposite a quarter-rest, half-rest, or whole rest, respectively, and has another turn if the indicator stops opposite the repeat. If the indicator should stop opposite a note accompanied by a sharp or a flat, the player scores or loses a predetermined number of points, respectively.

To familiarize the player with the keyboard of a piano or organ, each player being provided with checkers, as hereinbefore indicated, places a checker upon the key-representing space or division which is lettered and numbered and relatively arranged to correspond with the lettering, numbering, and relative position, respectively, of a note to which the indicator spun by him points. If, for instance, the player using the bass staff and coöperating indicator had spun the indicator to point to a note on the upper line of the staff, which note is named "A" and numbered "3," the player would place a checker $x$, as shown, upon the key-representing space or division named "A" and numbered "3," because the first key, named "A," below the key known as "middle C" of the keyboard corresponds in relative position to a note placed upon the upper line of the bass clef.

What I claim is—

In a game apparatus, a table or board provided upon its upper portion with a picture or representation of a keyboard of a piano or organ, which board is also provided upon its upper side with a musical notation; a pointer or indicator adapted to point to characters of the musical notation; means for changing the relative positions of the indicator and muiscal notation, and a movable checker $x$.

In testimony whereof I sign the foregoing specification in the presence of two witnesses.

ESTELLA BERG.

Witnesses:
C. H. DORER,
B. C. BROWN.